Patented Sept. 30, 1924.

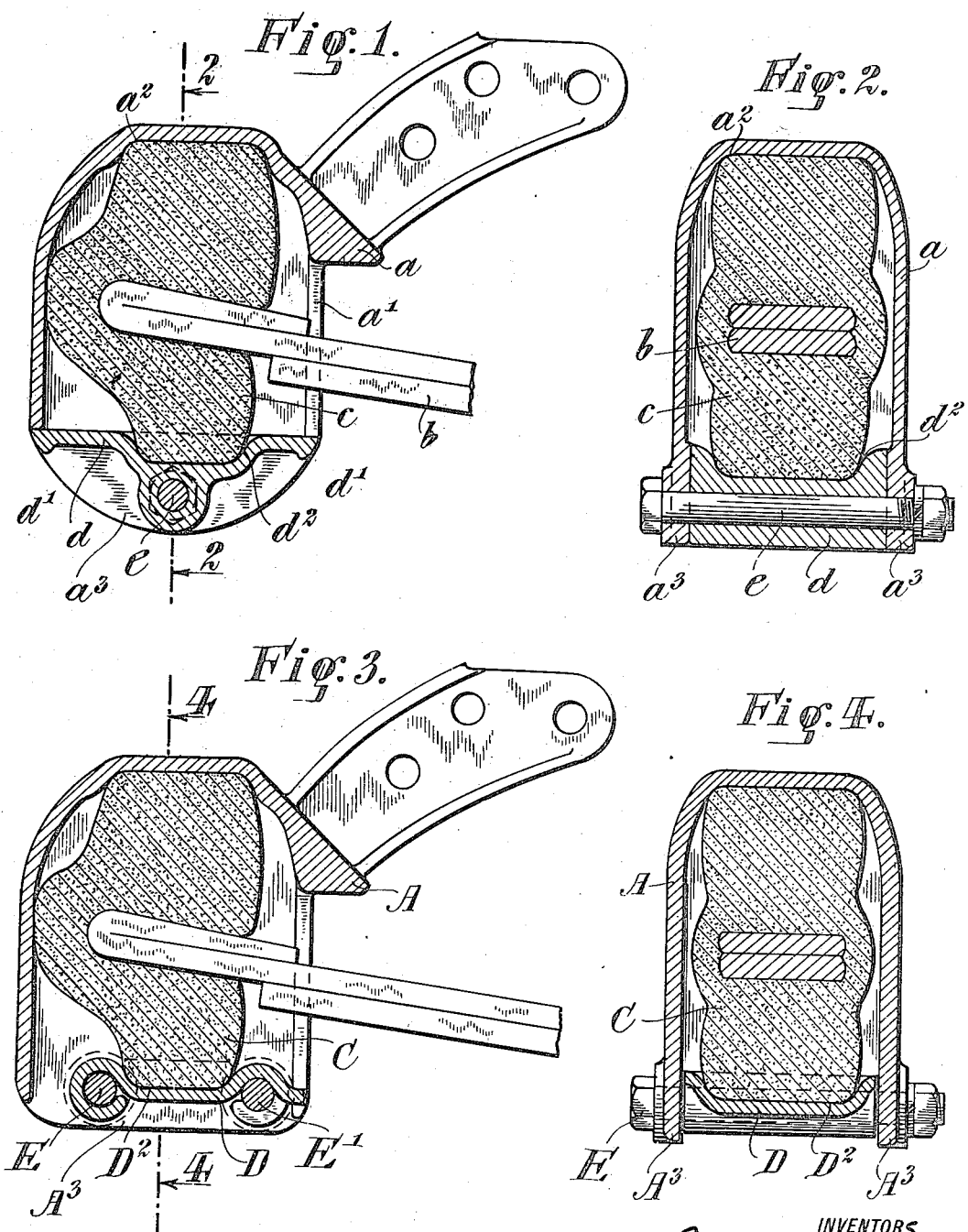

1,510,235

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

HOUSING FOR CUSHION CONNECTIONS FOR VEHICLE CONSTRUCTION.

Application filed March 14, 1922. Serial No. 543,662.

*To all whom it may concern:*

Be it known that we, ALFRED F. MASURY and AUGUST H. LEIPERT, citizens of the United States, and residing respectively in the borough of Manhattan and in the borough of Queens, of the city of New York, in the State of New York, have invented certain new and useful Improvements in Housings for Cushion Connections for Vehicle Construction, of which the following is a specification, reference being had to the accompanying drawings, forming a part hereof.

In Letters Patent of the United States, No. 1,404,876 dated January 31, 1922, there is disclosed an improved non-metallic connection between metal parts of a motor vehicle. One of the elements of such connection is a housing to confine the non-metallic resilient block. The present application is intended to cover, both generically and specifically, suitable housings for use in connections of the aforesaid type. More particularly, the invention is concerned with housings to confine resilient blocks employed as the connecting element between the end of a vehicle spring and the frame of the vehicle. The invention has for its object to provide a housing which shall be of suitable construction for the purpose referred to, shall afford suitable seats for the resilient block, shall be readily attachable to the frame of the vehicle, and shall include a cap detachably secured thereto by means which facilitate the ready assembling and disassembling of the parts. In some of the specific forms of housing disclosed in the present application especial attention is given to the character of the closing cap and the means for uniting the cap with the housing.

Reference is now to be had to the accompanying drawings for a detailed description of several illustrative embodiments of housings adapted for the purpose in which:

Figure 1 is a view in vertical section of a housing for the front end of a front vehicle spring in which the cap is secured in place by a transverse bolt passing directly through the side walls of the housing.

Figure 2 is a view in section taken at right angles to the plane of the section of Figure 1 and along the line indicated at 2—2 in Figure 1 and looking in the direction of the arrows.

Figures 3 and 4 are views similar, respectively, to Figures 1 and 2 but showing a modified form of cap with other retaining means therefor.

Figure 5:
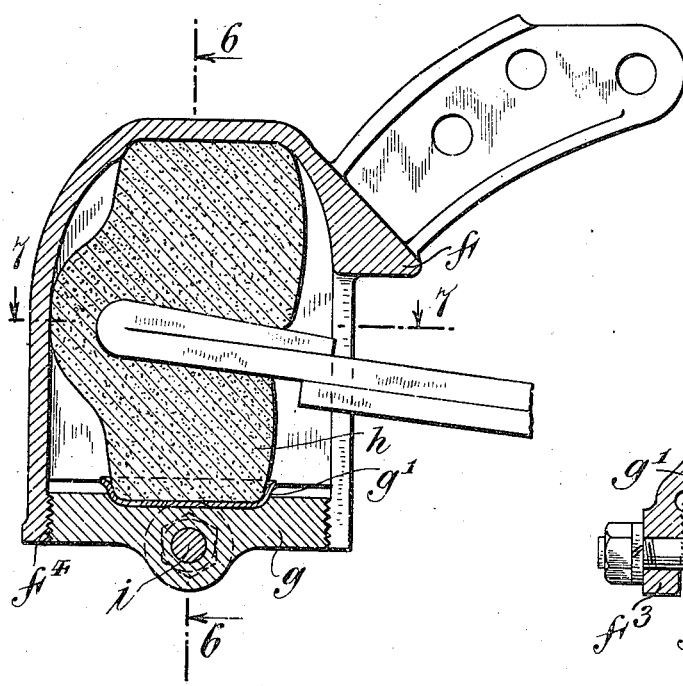
Figure 5 shows in vertical section still another form of housing in which the bottom cap is screwed into the side walls of the housing.
Figure 6:
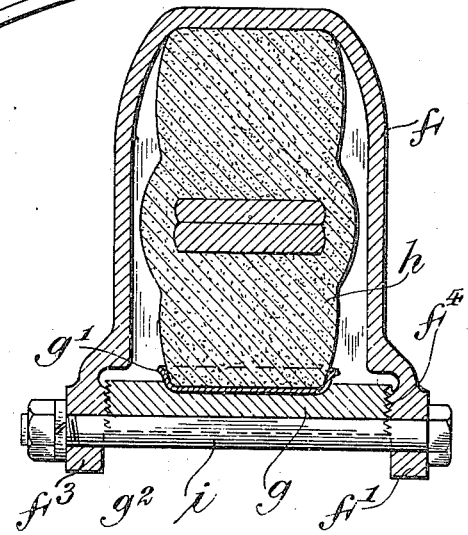
Figure 7:
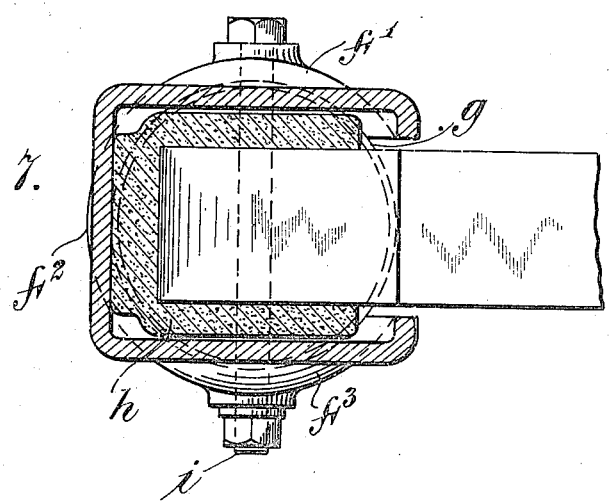

Figures 6 and 7 are sections taken on the planes indicated by the lines 6—6 and 7—7 of Figure 5 respectively and looking in the directions of the arrows.

The invention disclosed in said Letters Patent No. 1,404,876 consists essentially of a wholly non-metallic connection interposed between two metal parts of a motor vehicle and including a non-metallic block which is held against displacement with respect to the two metal parts. The present invention is concerned specifically with a suitable housing for confining such a resilient block so that it will be held against displacement at least with respect to one of the two metal parts to be connected. For convenience in description and particularly because it is believed that such a connection will find its most practical application between the spring and frame of a motor vehicle, such an embodiment is illustrated in the drawings. Broadly, however, the invention is not to be so limited since it is understood that such a connection may be employed in other situations in a motor vehicle and the same need for some kind of a housing for the block will be present.

As shown in Figure 1 a housing $a$ is cast with an open side wall $a'$ to receive a vehicle spring $b$ the end of this spring being engaged with a block $c$ of non-metallic yielding material, such as rubber. It will be understood that more than one block may be provided where desirable. The block $c$ is engaged with the end of the spring $b$ and is to be engaged at some other point, remote from said spring, with the vehicle frame. The function of the housing $a$, broadly, is to confine the block $c$ and hold it against displacement with respect to the frame. To this end, the housing $a$ is formed, as in its upper wall as shown in the drawings, with a seat $a^2$ for the block $c$. For convenience in assembling and disassembling it is obviously necessary to provide the housing $a$ with a removable section or cap such as $d$ whereby the block $c$ may be put in place or removed as may be necessary. In the embodiment illustrated in Figures 1 and 2, the side walls of the housing $a$ are extended downwardly as at $a^3$ to provide lugs through which may pass transversely a bolt $e$ which extends through the cap $d$ and holds it in place. At its ends the cap bears against the end walls of the housing as indicated at $d'$ so that it may not turn on the bolt $e$. In the wall of the cap $d$ may be formed a seat $d^2$ for the block $c$ so as to further hold the block against displacement with respect to the frame of the vehicle. Of course, when more than one block is employed in the housing the seats $a^2$, $d^2$ may be provided for different blocks and yet serve the same general purpose.

As shown in Figures 3 and 4 the housing A is generally similar to the housing $a$ except that its cap D may be hinged to the side walls $A^3$ of the housing on a transverse bolt E. The bolt E is so disposed that the cap D may swing downwardly about it when the block C is to be inserted in the housing or removed. When the block C is in place the cap D may be secured in a horizontal position to act as a seat for the block by means of a second transverse bolt E' which passes under the cap D adjacent to the free edges thereof and through the side walls $A^3$ of the housing A. For convenience, the cap D may be formed so that the seat $D^2$ for the block C will naturally fall between the bolts E, E'. To effect this, of course, the cap D is curved upwardly at the points where it rests on the bolts E, E'.

In Figures 5-7 the lower wall of the housing $f$ is formed with curved sections $f'$, $f^2$, $f^3$ which may be threaded internally as indicated at $f^4$ to receive a circular threaded cap $g$. This cap $g$ may have formed therein or carry as a separate element a seat $g'$ for the block $h$. When the cap $g$ is threaded home a bolt $i$ may be passed through the opposite side walls $f'$, $f^3$ of the housing $f$ and engage a transverse groove $g^2$ on the underside of the cap so as to hold it against accidental rotation.

As indicated hereinbefore, other designs of housing will suggest themselves to a skilled mechanic to meet the particular situation in which the improved connection is to be employed and it is the province of the present application to cover, as a new article of manufacture, a housing of any description for use in such a connection as well as certain features of design which are thought to be of particular importance in such a housing.

What we claim is:

1. As an article of manufacture, a housing for a non-metallic resilient connection between the spring and frame of a motor vehicle having an opening of substantially the entire bottom area, a cap of less area than said opening and disposed within the same above the lower edges of the side walls of the housing and a bolt passing through apertures in the side walls to secure said cap in closing relation with respect of the opening.

2. In an article of manufacture, a housing for nonmetallic resilient connections between the spring and frame of motor vehicles having an opening of substantially the entire bottom area, a cap of less area than said opening and disposed within the same above the lower edges of the side walls of the housing, a seat formed in said cap, a cooperating seat formed in the upper surface of the housing and a bolt passing through apertures in the side walls and cap to secure said cap in closing relation with respect of the opening.

3. In an article of manufacture, a housing for nonmetallic resilient connections between the spring and frame of motor vehicles having an opening of substantially the entire bottom area, means formed with said housing for engagement with the vehicle frame, a cap of less area than said opening and disposed within the same above the lower edges of the side walls of the housing, a bolt passing through apertures in the side walls and cap to secure said cap in pivotal relation with respect of the housing, and a second bolt to maintain said cap in closing relation with respect of the opening.

This specification signed this 10th day of March 1922.

ALFRED F. MASURY.
AUGUST H. LEIPERT.